United States Patent
Yamamoto

Patent Number: 5,312,302
Date of Patent: May 17, 1994

[54] AUTO-TENSIONER

[75] Inventor: Yoshiya Yamamoto, Kusatsu, Japan

[73] Assignee: NSK Ltd., Tokyo, Japan

[21] Appl. No.: 47,577

[22] Filed: Apr. 13, 1993

[30] Foreign Application Priority Data

Apr. 23, 1992 [JP] Japan .................. 4-33746[U]

[51] Int. Cl.$^5$ .............................................. F16H 7/08
[52] U.S. Cl. ................................................... 474/135
[58] Field of Search ............... 474/101, 109, 110, 113, 474/117, 133, 135, 136, 138

[56] References Cited

U.S. PATENT DOCUMENTS

| | | | |
|---|---|---|---|
| 4,784,631 | 11/1988 | Henderson | 474/135 |
| 5,030,172 | 7/1991 | Green et al. | 474/135 |
| 5,234,385 | 8/1993 | Kawashima et al. | 474/135 |

*Primary Examiner*—Thuy M. Bui
*Attorney, Agent, or Firm*—Helfgott & Karas

[57] ABSTRACT

An auto-tensioner comprising a fixed shaft having a cylindrical surface section formed on the tip of the fixed shaft, eccentric to the centeraxis of the fixed shaft, a rocker member coaxial with the fixed shaft and a damper plate such that the outer peripheral edge of the damper plate is slidally engaged with the inner peripheral surface of the rocker member, and that the cylindrical surface section is fitted into a circular hole provided eccentrically in the center section of the damper plate so that the damper plate is secured to the tip of the fixed shaft so as not to rotate.

1 Claim, 2 Drawing Sheets

AUTO-TENSIONER

BACKGROUND OF THE INVENTION

1. Field of the Invention

The present invention relates to an auto-tensioner, and in particular to an auto-tensioner used to apply proper tension to an engine timing belt for an automobile or a belt for driving an auxiliary machinery such as an alternator or a compressor (hereinafter referred to as simply "belt" in both cases).

2. Description of the Prior Art

Conventionally, an auto-tensioner of the type illustrated in FIG. 3 and FIG. 4, for example, is used to apply proper tension to a belt. A tubular fixed shaft 1 is secured e.g. to the front surface of an engine cylinder block by a bolt (omitted from the drawings). A half-casing 2 is secured on the base end section (left end in FIG. 3) of the fixed shaft 1 concentric to the fixed shaft 1, and an engaging projection 3 is secured to the axially outer end surface of the half-casing 2. The engaging projection 3 is to be engaged with an engaging indentation (not shown) formed on the front surface of the cylinder block to prevent the rotation of the fixed shaft 1.

A cylindrical section 5 provided on a rocker member 4 is externally fitted on this fixed shaft 1 through a sliding bearing 6 therebetween. A rocker arm 7 extends radially outward from the cylindrical section 5, and a pivot shaft 8 is provided on the tip of the rocker arm 7, parallel to the fixed shaft 1. A tension pulley 9 is pivotally supported on the pivot shaft 8 by means of a rolling bearing 10.

A half-casing 11 is provided on one part of the rocker member 4, concentric with the cylindrical section 5. A case 14 for enclosing a torsion coil spring 13 is formed by combining the half-casing 11 and the half-casing 2 in a nested shape.

One end of the torsion coil spring 13 is engaged with the half-casing 2 on the side of the fixed shaft 1 with the other end engaged with the half-casing 11 on the side of the rocker member 4 to impart an elastic force on the rocker member 4 in a direction to force the tension pulley 9 elastically toward a belt. Accordingly, the tension on the belt is normally maintained at a uniform level with the tension pulley 9 being pressed against the belt, regardless of any changes in the dimensions of the belt from a temperature change or the like, or vibration or the like from the operation of the engine.

Further, the inner peripheral edge section of a damper plate 15 is secured to the outer periphery of the axial tip portion (the right end in FIG. 3) of the fixed shaft 1, so that the outer peripheral edge section of the damper plate 15 slides on one part of the inner peripheral surface of the rocker member 4. Specifically, the damper plate 15 is fabricated together with the fixed shaft 1 and the half-casing 2 e.g. by die-cast forming from aluminum. A rectangular tubular section 16 is formed on the outer peripheral surface of the axial tip of the fixed shaft 1, and a rectangular hole 17 is formed at the center of the damper plate 15 to receive the rectangular tubular section 16 inserted thereinto. The axial tip of the rectangular tubular section 16 is then deformed by caulking or crimping against the peripheral edge section of the rectangular hole 17 to form caulked or crimped sections 18 so that the damper plate 15 is non-rotatably secured to the axial tip of the fixed shaft 1 from the effect of the caulked or crimped sections 18.

In this manner, an annular clearance space 19 is provided axially between the damper plate 15 and the rocker member 4 with the damper plate 15 secured to the axial tip portion of the fixed shaft 1. An 0-ring 21 is fitted into an indented annular groove 20 formed over the entire periphery on the outer peripheral surface of the damper plate 15 in either axial end section thereof. The outer peripheral edges of the 0-rings 21 is adapted to slide on the inner peripheral surface of the rocker member 4 to liquid-tightly close off the two end sections of the clearance space 19.

A viscous fluid 22 such as silicone oil or the like is filled into this clearance space 19 through a filling hole 23. The filling hole 23 is closed off by the insertion of a steel ball 24, after the filling operation.

In this manner, the viscous fluid 22 is sealingly enclosed in the clearance space 19 which is present between the fixed shaft 1, specifically the damper plate 15 and the rocker member 4 which are relatively displaced in the direction of rotation. Accordingly, when the belt vibrates with a small amplitude during the operation of the engine, this vibration, transmitted to both the tension pulley 9 and the rocker member 4, is damped by the viscous fluid 22 in the clearance space 19, so that the vibration of the tension pulley 9 and the rocker member 4 does not grow.

The present invention is designed to eliminate any backlash in the engaged section of the damper plate 15 with respect to the fixed shaft 1 without increasing the fabrication costs of the auto-tensinor with the structure and operation described above.

Conventionally, in order that the damper plate 15 is secured to the fixed shaft 1 so as not to rotate, the rectangular tubular section 16 on the axial tip portion of the fixed shaft 1 is formed simultaneously with the fabrication by die-casting of the fixed shaft 1, while the rectangular hole 17 in the center section of the damper plate 15 is formed simultaneously with the fabrication by die-casting of damper plate 15. Accordingly, because of unavoidable fabrication errors, backlashes are produced unavoidably in the engaged section when the rectangular tubular section 16 and the rectangular hole 17 are fitted together. Therefore, there are occasions where these backlashes cannot be eliminated, even when the caulked or crimped sections 18 are formed on the axial tip portion of the rectangular tubular section 16.

If the dimensional precision of the rectangular tubular section 16 and the rectangular hole 17 is improved by not using die-casting as the fabrication method, but rather forming by a machining process such as a shaper process or the like, the degree of backlash production in the above-mentioned engaged section would be reduced, so that it is possible to completely eliminate the backlashes in the engaged section by providing the caulked sections 18. But this is not desirable because the cost of fabrication is increased.

SUMMARY OF THE INVENTION

Accordingly, an object of the present invention is to provide, with due consideration to the drawbacks of such conventional devices, an auto-tensioner wherein there is substantially no backlash in the engaged section which secures a damper plate to a fixed shaft, without increasing the fabrication costs.

BRIEF DESCRIPTION OF ACCOMPANYING DRAWINGS

DETAILED DESCRIPTION OF THE PREFERRED EMBODIMENTS

Figure 1:
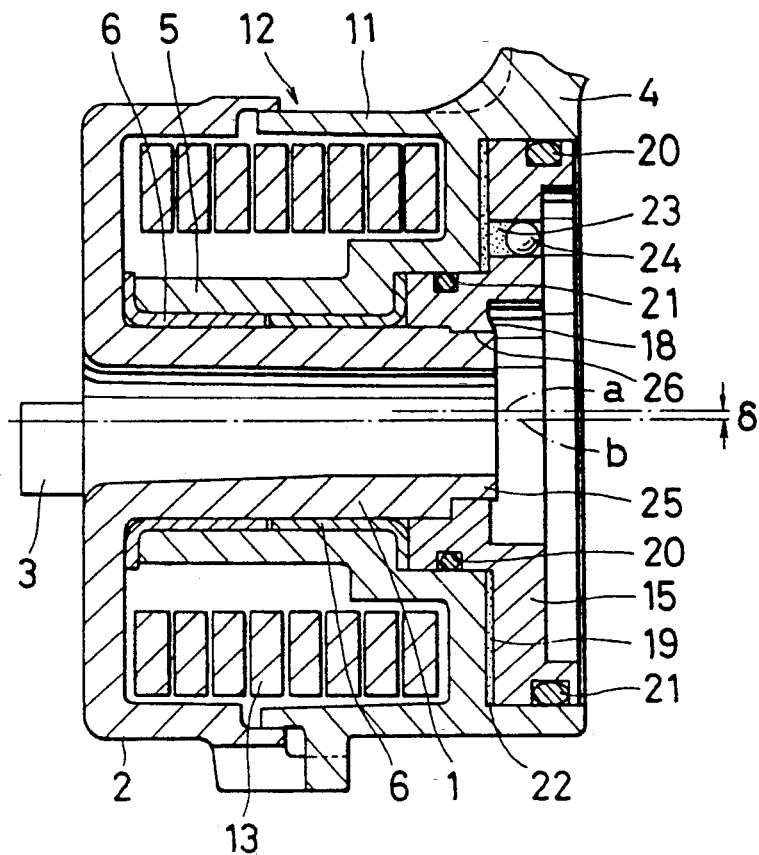
FIG. 1 is a partially cut-away, cross-sectional view of an embodiment of the present invention.

In the present invention, an auto-tensioner comprises, in the same manner as the above-described conventional auto-tensioner, a fixed shaft extending along a center axis and having a tip portion with an end face; a rocker member supported in a freely swinging manner around the fixed shaft and having an inner perpheral surface concentric with the fixed shaft; a pivot shaft extending from the rocker member parallel to the fixed shaft; a tension pulley supported in a freely rotatable manner on the pivot shaft; a spring means connected to the fixed shaft and the rocker member for resiliently forcing the tensino pulley; a damper plate havaing an iner peripheral portion secured around the tip portion of the fixed shaft for defining first and second holes and an outer peripheral portion provided in a sliding relationship with the inner peripheral surface of the rocker member and having a center axis coaxial with the fixed shaft; a clearance space provided between the damper plate and the rocker member; a sealing material for closing off the clearance space; and a viscous fluid enclosed in the clearance space.

In the auto-tensioner of the presnet inventin, the first cylindrical surface section is formed on the tip portion of the fixed shaft coaxial with the center axis thereof, while the second cylindrical surface section is formed on the tip portion of the fixed shaft closer to the end face of the fixed shaft and has a center axis with a specified amount of eccentricity with respect to the center axis of the fixed shaft, and the first circular hole is externally fitted onto the first cylindrical surface section coaxial with the center axis of the outer peripheral portion of the damper plate while the secnod circular hole is externally fitted onto the second cylindrical surface section coaxial therewith.

In the auto-tensioner of the present invention formed in the above manner, a proper tension is applied to a belt in the substantially same manner as in the conventional auto-tensioner described above, and also vibrations transmitted to the tension pulley from the belt are damped in the substantially same manner as in the conventional auto-tensioner described above.

In particular, in the case of the auto-tensioner of the present invention the provision of the eccentric condition makes it possible to prevent the damper plate from rotating with respect to the fixed shaft, because of the engagement of the cylindrical surface section and the circular hole. The cylindrical surface section and the circular hole can be easily formed, and, furthermore, high dimensional precision of the various parts is easily maintained. Accordingly, there is no backlash in the engaging section between the cylindrical surface section and the circular hole, and in addition the dimensional precision of the various parts is improved, so that the fabrication costs for the auto-tensioner are not high.

An embodiment of the present invention will now be explained with reference to the drawings.

Figure 2:
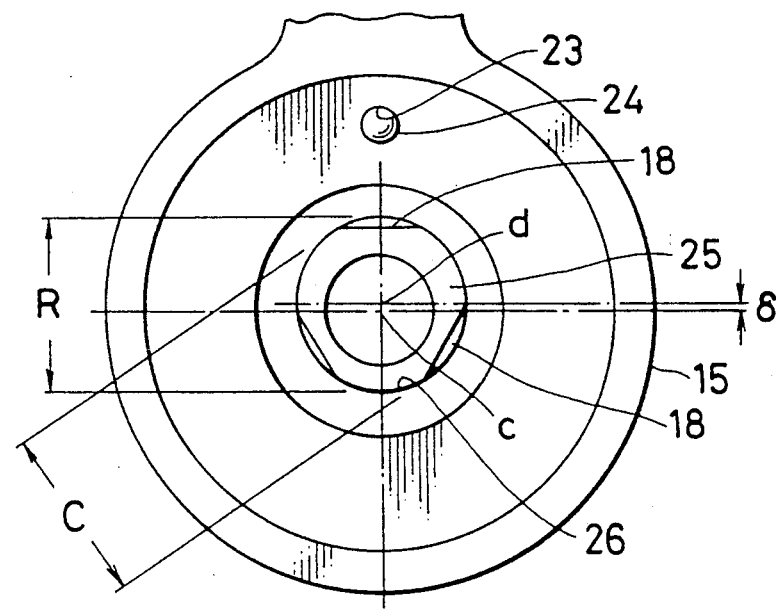
FIG. 2 is a view of the embodiment shown in FIG. 1, viewed from the right side.
Figure 3:
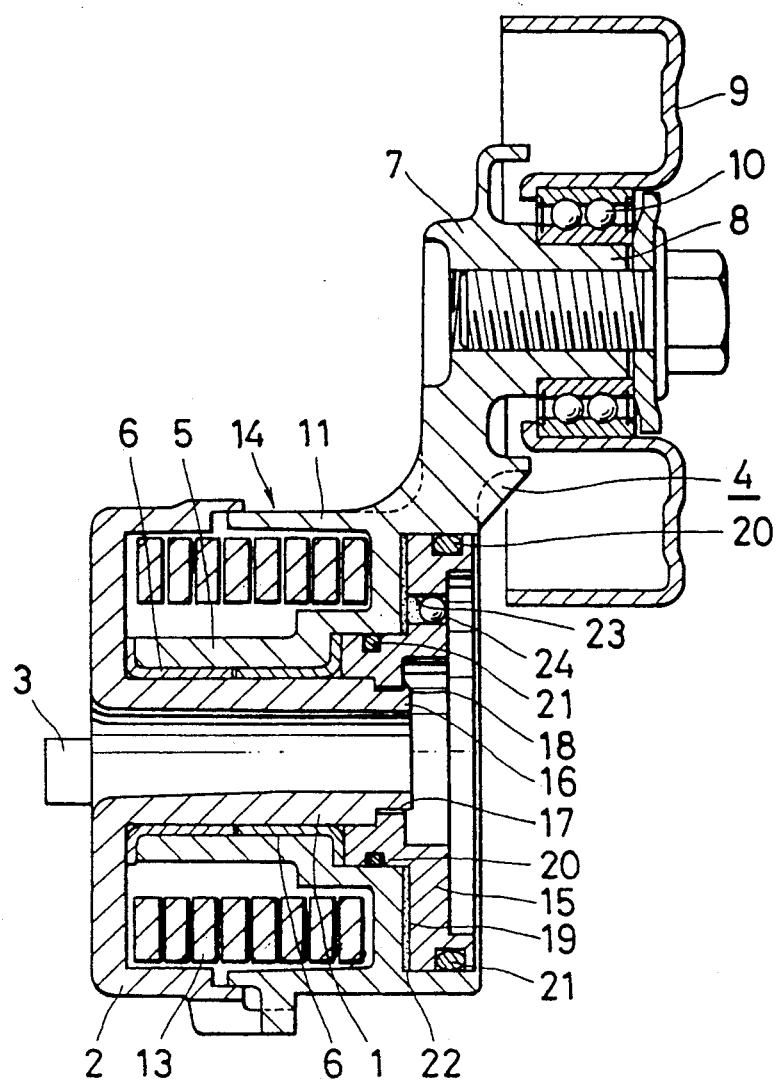
FIG. 3 is a cross-sectional view of an example of a conventional auto-tensioner.
Figure 4:
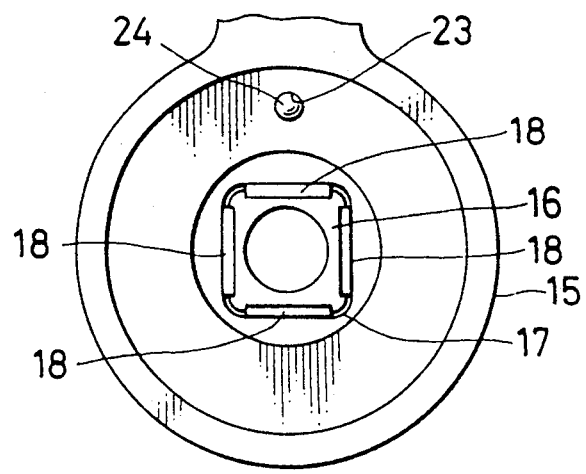
FIG. 4 is a view of the conventional auto-tensioner shown in FIG. 3 from the right side with the tension pulley and part of the rocker arm omitted.

FIG. 1 and FIG. 2 show an embodiment of the auto-tensioner according to the present invention. The auto-tensinor comprises a fixed shaft 1 of a tubular shape, a rocker member 4 externally fitted on the fixed shaft 4, and a damper plate 15 secured to an axial tip of the fixed shaft 2.

The fixed shaft 4 has an extension to form a half-casing 2 concentric to the fixed shaft 1, while the rocker member comprises a cylindrical section 5 externally fitted on the fixed shaft 1, a rocker arm 7 extending radially outward from the cylindrical section 5, a pivot shaft 8 provided parallel to the fixed shaft 1 in the tip of the rocker arm, and a half-casing 11 provided in an telescopic relationship with the half-casing 2.

The features of the present invention are the structure of the part which secures a damper plate 15 to a fixed shaft 1 in a non-rotatable manner. The structure and operation of the other parts are substantially the same as for the above-described conventional device, therefore parts of the structure have been omitted from the drawings. In the drawings, like reference numerals designate parts which are identical to or correspond to parts of the above-described conventional device, therefore further explanation has been omitted on these parts.

A cylindrical surface section 25 with a smaller diameter than the outer peripheral surface of the fixed shaft 1 is formed on the outer peripheral surface of the axial tip of the tubular fixed shaft 1 by machining e.g. in a lather. The outer periphery of the section 25 is made eccentric with respect to the outer periphery or the center axis of the fixed shaft 1. Specifically, the center axis a of the cylindrical surface of the section 25 is provided with a predetermined amount of eccentricity $\delta$ with respect to the center axis b of the fixed shaft 1.

A circular hole 26 is formed in almost the center of the damper plate 15 but eccentric with respect to the axis of the fixed shaft 1. Specifically, the center axis d of the circular hole 26 is provided with the predetermined amount of eccentricity $\delta$ with respect to the center axis c of the outer peripheral edge of the damper plate 15.

Before the damper palte 15 and the fixed shaft 1 are assembled, the inside diameter R of the circular hole 26 is made the same to or slightly smaller than the outer diameter D of the cylindrical surface section 25 ($R \leq D$), so that the cylindrical surface section 25 is tightly fitted into the circular hole 26 with no play or backlash between the circular hole 26 of the damper plate 15 and the cylindrical surface sectin 25 of the fixed shaft 1.

Once the damper plate 15 is engaged onto the tip portion of the fixed shaft 1, the cylindrical surface section 25 is fitted into the circular hole 26, and caulking sections 18 are formed by caulking the tip of the cylindrical surface section 25 against the peripheral edge of the circular hole 26, as required.

The damper plate 15 can be prevented from rotating with respect to the fixed shaft 1 of the auto-tensioner of the present invention with the structure described above, as a result of the engagement of the cylindrical surface sectin 25 and the circular hole 26 provided in an eccentric relationship.

Specifically, because the outer peripheral edge of the damper plate 15 slides on the inner peripheral surface of the rocker member 4 at a part thereof which has the same center axis as the center axis b of the fixed shaft 1, the damper plate 15 does not swing around the periphery of the fixed shaft 1. Accordingly, the damper plate 15 does not rotate with respect to the fixed shaft 1 due to the engagement of the cylindrical surface section 25 and the circular hole 26, each provided with a specified amount of eccentricity δ with respect to the center axis b of the fixed shaft 1.

The cylindrical surface section 25 and the circular hole 26 can easily be formed by machining in a lathe, and, in addition, the outer diameter of the cylindrical surface section 25 and the inner diameter of the circular hole 26 can be easily finished with high precision in size. Accordingly, there is no play or backlash between the cylindrical surface section 25 and the circular hole 26, and the dimensional precision of the parts 25, 26 is also improved without the necessity of high fabrication costs for the auto-tensioner.

Because of the above-described simple structure, the autotensioner of the present invention can be fabricated with no backlash at the section securing the damper plate to the fixed shaft and without increasing cost.

What is claimed is:

1. An auto-tensioner comprising:
   a fixed shaft extending along a center axis and having a tip portion with an end face;
   a rocker member supported in a freely swinging manner around the fixed shaft and having an inner peripheral surface concentric with the fixed shaft;
   a pivot shaft extending from the rocker member parallel to the fixed shaft;
   a tension pulley supported in a freely rotatable manner on the pivot shaft;
   a spring means connected to the fixed shaft and the rocker member for resiliently forcing the tension pulley;
   a damper plate having an inner peripheral portion secured around the tip portion of the fixed shaft for defining first and second circular holes and an outer peripheral portion provided in a sliding relationship with the inner peripheral surface of the rocker member and having a center axis coaxial with the fixed shaft;
   a clearance space provided between the damper plate and the rocker member;
   a sealing material for closing off the clearance space; and
   a viscous fluid enclosed in the clearance space;
   a first cylindrical surface section formed on the tip portion of the fixed shaft and coaxial with the center axis of the fixed shaft;
   a second cylindrical surface section formed on the tip portion of the fixed shaft closer to the end face and having a center axis with an amount of eccentricity with respect to the center axis of the fixed shaft;
   the first circular hole being externally fitted onto the first cylindrical surface section and coaxial with the center axis of the outer peripheral portion of the damper plate; and
   the second circular hole being externally fitted onto the second cylindrical surface section and coaxial with the second cylindrical surface section.

* * * * *